United States Patent [19]

Nevlud

[11] Patent Number: 4,809,740
[45] Date of Patent: Mar. 7, 1989

[54] EXCESS FLOW LIMITER

[76] Inventor: Pavel Nevlud, R.R. 1, S-11, C-54, Naramata, British Columbia V0H 1N0, Canada

[21] Appl. No.: 141,958

[22] Filed: Jan. 11, 1988

[51] Int. Cl.⁴ ............................................. F16K 17/24
[52] U.S. Cl. ..................................... 137/460; 137/39; 137/498
[58] Field of Search ................... 137/39, 460, 498, 517

[56] References Cited

U.S. PATENT DOCUMENTS

| | | | |
|---|---|---|---|
| 1,001,324 | 8/1911 | Thompson | 137/460 |
| 1,119,287 | 12/1914 | Krichbaum | 137/460 |
| 2,245,271 | 6/1941 | Guill | 137/498 X |
| 2,750,956 | 6/1956 | Stevenson | 137/460 |

Primary Examiner—Robert G. Nilson
Attorney, Agent, or Firm—Pretty, Schroeder, Brueggemann & Clark

[57] ABSTRACT

An excess flow limiter for attachment in a flow path comprising a main body with a lower inlet chamber and an upper outlet chamber connected by a central vertical passage having an inlet end and an outlet end. A freely movable slide member is sealably housed in the central vertical passage and extends into the lower inlet chamber. The slide member comprises a hollow cylinder with a closed lower end having a flange with sealing means about the closed lower end to seal the inlet end of the central vertical passage. A support is mounted in the lower inlet chamber to support the closed lower end of the slide member that extends into the lower inlet chamber thereby supporting the slide member in the central vertical passage when necessary. A set of outflow apertures are provided in the side wall of the slide member above the flange to allow passage of flowable material from the lower inlet chamber to the upper outlet chamber through the hollow cylindrical interior of the slide member. The apertures are appropriately sized to allow the passage of a specified flow of material. The flow limiter can be reset after it has been triggered to stop excess flow by a button mounted in the outlet chamber directly above the central passage.

4 Claims, 2 Drawing Sheets

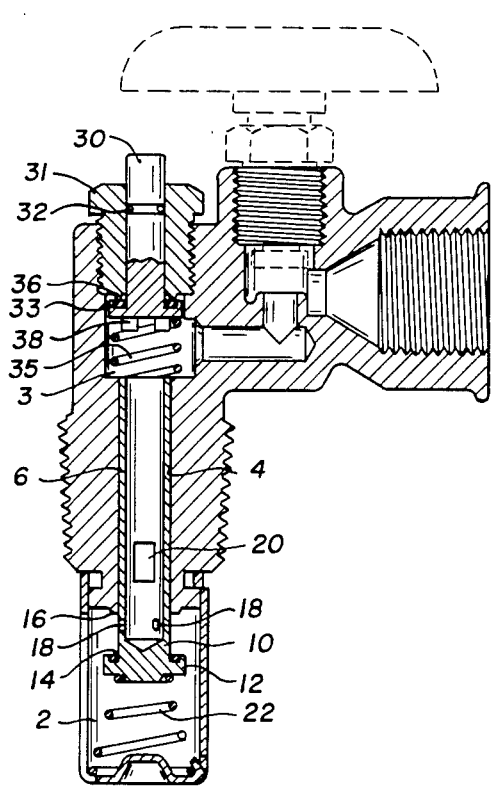
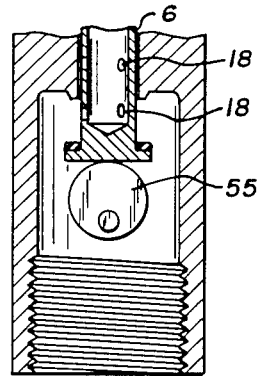
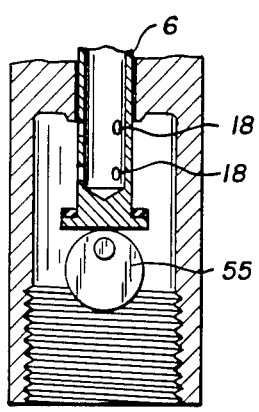
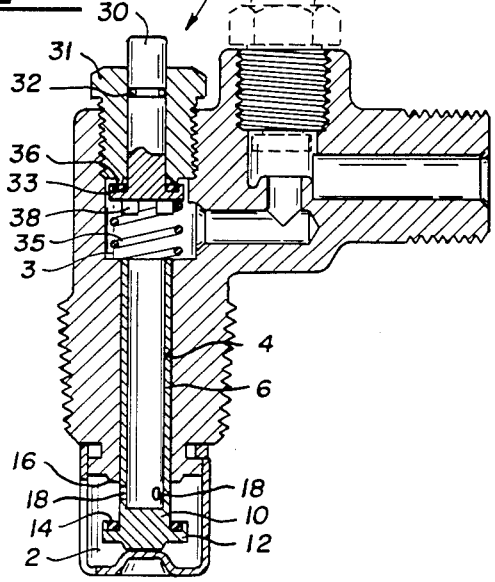

EXCESS FLOW LIMITER

FIELD OF THE INVENTION

This invention relates to a device for limiting excess flow.

BACKGROUND OF THE INVENTION

Flow limiters are devices installed in a line to shut off the flow of material in the line if that flow goes above a certain limit. Flow limiters are commonly used on pressurized containers as a safety device to shut off the flow if, for example, the delivery line should rupture. Flow limiters are often used as safety equipment on pressurized tanks containing propane or other explosive gases.

Flow limiters presently in use have some design limitations that the present invention seeks to overcome. Once a flow limiter has been triggered to cut off flow, it can be difficult and time consuming to reset the device in order to re-establish flow. Most flow limiters in use today rely on a leakable seal or a bleed screw to allow flow through the device.

In addition, many existing flow limiters allow for only one way flow through the device thereby preventing easy filling of the container to which the flow limiter is attached. These flow limiters must be removed from the container each time the container is to be refilled.

SUMMARY OF THE INVENTION

The present invention is an excess flow limiter comprising:

a main body with a lower inlet chamber and an upper outlet chamber connected by a central vertical passage having an inlet end and an outlet end;

a freely movable slide member sealably housed in said central vertical passage and extending into said lower inlet chamber comprising a hollow cylinder with a closed lower end having a flange with sealing means about the closed lower end to seal the inlet end of said central vertical passage;

support means mounted in said lower inlet chamber to support the closed lower end of said slide member that extends into said lower inlet chamber thereby supporting said slide member in said central vertical passage when necessary;

a set of outflow apertures in the side wall of said slide member above said flange to allow passage of flowable material from the lower inlet chamber to the upper outlet chamber through the hollow cylindrical interior of said slide member, said apertures being appropriately sized to allow the passage of a specified flow of material;

and means to reset the flow limiter after it has been triggered to stop excess flow comprising a button member mounted in said outlet chamber directly above said central passage, said button being normally biased by spring means into an upper rest position whereupon pressing the button member causes said member to move downwardly to contact and bear against the upper edge of said slide member in order to push said slide member downwardly in said central passage to realign the slide member into the proper working configuration.

The present flow limiter incorporates a number of unique features not available in current flow limiter design. The present invention is equipped with a reset button which allows the device to be easily reset at the discretion of the operator after the device has been tripped.

As an added safety feature, the present device will automatically shut off a container if the container is inverted as might happen if the container were tipped over.

In a further embodiment, the present device allows the operator to quickly refill a container to which the device is attached with the device still in position.

BRIEF DESCRIPTION OF THE DRAWINGS

The present device is illustrated in the following drawings in which:

FIG. 5 is a sectioned view showing the present invention incorporated into the main valve of a pressurized container used with propane appliances in motor homes, campers, boats or barbecues.

FIG. 6 is a sectioned view showing a modified embodiment of the present invention incorporated into the outlet valve of a tank having a separate filling inlet and used with propane or natural gas operated vehicles.

FIG. 7 is a detailed view of the cam system used to vary the flow through the device with the slide member in the low flow position.

FIG. 8 is a detailed view of the cam system used to vary the flow through the device with the slide member in the maximum flow position.

DESCRIPTION OF THE PREFERRED EMBODIMENTS

Figure 1:
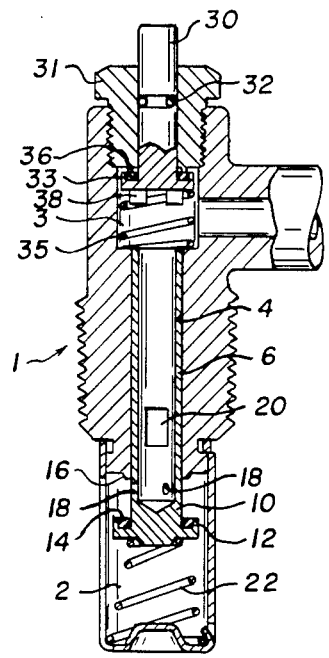
FIG. 1 is a sectioned drawing of a preferred embodiment of the present invention in its working configuration.

Referring to FIG. 1, there is shown a preferred embodiment of the present flow limiting device. The device consists of a main body 1 with a lower inlet chamber 2 connected to an upper outlet chamber 3 by a central vertical passage 4. Housed within central passage 4 is a slide member 6 which is free to move within the central passage. Slide member 6 consists of a hollow cylinder with a closed lower end 10 having a flange 12 into which a seal ring 14 is mounted. Flange 12 limits the upward travel of slide member 6 as seal ring 14 engages seat 16 at the lower end of the central passage 4. As shown in FIG. 1, slide member 6 has two sets of holes through its side walls - a lower smaller set of holes 18 just above flange 12 to allow for normal flow of material through the device, and a higher larger set of holes 20 for use when using the present device to fill a container.

Lower inlet chamber 2 houses spring 22 which supports the lower closed end of slide member 6. Slide member 6 is not connected to spring 22 and merely rests atop the spring when the present device is operating normally as shown in FIG. 1.

At the upper end of main body 1, above outlet chamber 3 is push button 30 for resetting the flow limiting device after it has cut off flow. Push button 30 is slidably housed within guide 31. O-ring 32 mounted about the stem of button 30 and seal ring 33 mounted at the base of button 30 seal the push button mechanism against leakage. Spring 35 in outlet chamber 3 serves to bias button 30 in a raised position thereby seating seal ring 33 against seat 36 to prevent leakage.

Figure 2:
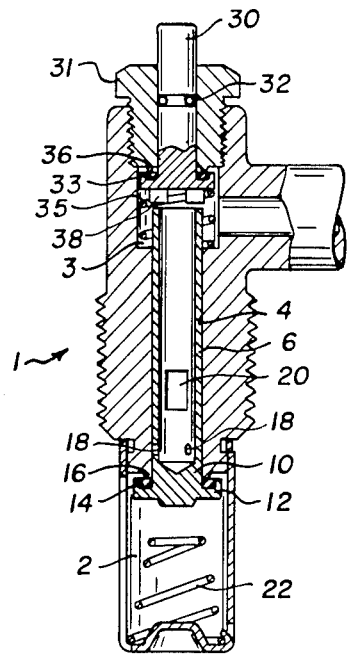
FIG. 2 is a sectioned drawing showing the preferred embodiment in its closed configuration.

The normal working configuration of the present device is shown in FIG. 1. Inlet chamber 2 is connected to a pipe or a pipe outlet of a pressurized container. The device is mounted in such a manner that the slide member 6 is disposed vertically and the reset button 30 is at the top of the device. The closed lower end of slide member 6 rests atop spring 22 and slide member 6 extends into inlet chamber 3 an amount sufficient to expose the set of outflow holes 18 below seat 16 at the base of central passage 4. During normal use, liquid or gas material flows from a pipe or pressurized container into inlet chamber 2 and through outflow holes 18 into the interior of slide member 6. The material travels up central passage 4 within the interior of slide member 6 and into outlet chamber 3 where the material exits from the device through an attached outlet pipe. Outflow holes 18 are sized to allow the passage of a certain amount of material per unit time through the interior of the slide member 6. If the outlet pipe from the flow limiting device ruptures or begins leaking, flow from the outlet chamber will increase. This results in a pressure drop in the upper outlet chamber 3, as the limited flow through outflow holes 18 cannot keep up the increased flow from outlet chamber 3. The relatively higher pressure in the lower inlet chamber then forces slide member 6 upwardly in central passage 4 withdrawing outflow holes 18 into central passage 4 and sealing seal ring 14 seals against seat 16 to effectively shut off flow through the device. FIG. 2 shows the present device in its closed configuration.

The force acting to raise the slide member 6 acts only to overcome the weight of the slide member as the member is not attached to spring 22. The fact that slide member 6 is normally under the force of gravity allows the present device to shut off the flow of material when the container to which the device is attached overturns. Due to gravity, slide member 3 will travel toward seat 16 and shut off the flow of material. Once outflow holes 18 are covered, the pressurized contents of the container will keep slide member 6 sealed against seat 16.

Figure 3:
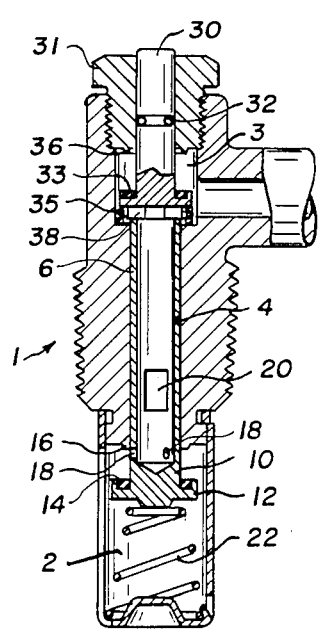
FIG. 3 is a sectioned drawing showing the preferred embodiment being reset.

Once the present device has been triggered to shut off flow, reset button 30 provides an quick and easy way of realigning the various components of the device to establish the working configuration shown in FIG. 1 and re-establish flow. As shown in FIG. 3, pressing reset button 30 causes tabs 38 at the base of button 30 to contact the upper edge of slide member 6 pushing the member downwardly in central passage 4 until outflow holes 18 are again exposed in inlet chamber 2. Flow is then re-established through holes 18 and into the interior of slide member 6. Flow enters into outlet chamber 3 through the channel between tabs 38. It is necessary to hold down reset button 30 until the pressure in the inlet and outlet chambers below and above the slide member have equalized. When this occurs, the slide member will drop down further to rest atop spring 22. When using reset button 30, O-ring 32 prevents material from leaking about the button stem. Upon release, reset button 30 is forced upwardly by spring 35 and seal ring 33 is seated against seat 36.

Figure 4:
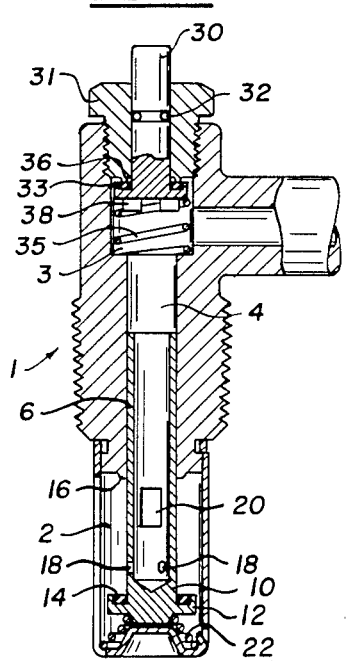
FIG. 4 is a sectioned drawing showing the preferred embodiment in its filling configuration.

A pressurized container equipped with the present device can be filled without removing the excess flow limiter. Such a feature saves a great deal of time and effort. When filling a pressurized container equipped with the present device, the filling nozzle is connected to the device's outlet chamber. During filling the direction of material flow is opposite that of normal use. As shown in FIG. 4, slide member 6 is pushed downwardly in central passage 4 by the greater pressure in the outlet chamber. Slide member 6 is pushed down so far that spring 22 is compressed and the set of large inflow holes 20 are exposed in inlet chamber 2. The larger inflow holes allow the pressurized container to be filled quickly. As the pressurized container is filled, the pressures in the inlet and outlet chambers will equalize allowing spring 22 to lift the slide member into its normal operating position, closing off inflow holes 20. If, during filling, the filling line is ruptured or the connection between the filling nozzle and the outlet chamber 3 is disconnected, the resulting drop in pressure in outlet chamber 3 will allow spring 22 to lift slide member 6 into operating position whereupon the higher pressure in inlet chamber 2 will further lift the slide member to seal against seat 16 shutting off the flow through the device.

FIG. 5 shows how the present device can be incorporated into the main valve of pressurized containers used with propane appliances such as are found in motor-homes, campers, boats or barbecues.

FIG. 6 shows a modified version of the present device incorporated into the outlet valve 50 of a tank having its own filling inlet as, for example, is used with propane or natural gas operated vehicles. In such a case, spring 22 and inflow holes 20 are not needed. Slide member 6 rests on the base of inlet chamber 2. The embodiment shown in FIG. 6 still has reset button 30.

In a further embodiment of the present invention, illustrated in FIGS. 7 and 8 variable flow through the device is possible. This is accomplished by providing the slide member 6 with upper and lower sets of outflow holes 18 and replacing spring 22 with a cam member 55 mounted within inlet chamber 2 to support slide member 6. By varying the position of cam 55 slide member 6 can be raised of lowered within central passage 4 exposing a single set or both sets of outflow holes 18. In FIG. 7, cam 55 is positioned so that only the lower row of outflow holes is exposed. In FIG. 8, cam 55 is positioned to expose both the upper and lower sets of outflow holes thereby increasing the flow capacity of the device. Necessarily, such an arrangement does not allow the flow limiter to be used for filling a container as spring 22 has been replaced by cam 55.

I claim:

1. A excess flow limiter for attachment in a flow path comprising:

a main body with a lower inlet chamber and an upper outlet chamber connected by a central vertical passage having an inlet end and an outlet end;

a freely movable slide member sealably housed in said central vertical passage and extending into said lower inlet chamber comprising a hollow cylinder with a closed lower end having a flange with sealing means about the closed lower end to seal the inlet end of said central vertical passage;

support means mounted in said lower inlet chamber to support the closed lower end of said slide member that extends into said lower inlet chamber thereby supporting said slide member in said central vertical passage when necessary;

a set of outflow apertures in the side wall of said slide member above said flange to allow passage of flowable material from the lower inlet chamber to the upper outlet chamber through the hollow cylindrical interior of said slide member, said apertures being appropriately sized to allow the passage of a specified flow of material;

and means to reset the flow limiter after it has been triggered to stop excess flow comprising a button member mounted in said outlet chamber directly above said central passage, said button being normally biased by spring means into an upper rest position whereupon pressing the button member causes said member to move downwardly to contact and bear against the upper edge of said slide member in order to push said slide member downwardly in said central passage to realign the slide member into the proper working configuration.

2. A device as claimed in claim 1 in which said support means to support said slide member is a coiled spring.

3. A device as claimed in claim 1 with means to adjust the flow through the device comprising a modified slide member with two sets of outflow apertures in the wall of said slide member, one set being a distance above the first set, and a cam member in the inlet chamber to support the lower closed end of said slide member, whereby rotating the cam moves the slide member in said central passage between a first position where only the lower set of apertures is exposed in said inlet chamber for an initial flow, and a second position where both sets of apertures are exposed in said inlet chamber for a higher flow through the device.

4. A device as claimed in claim 1 including a set of inflow apertures through the side wall of said slide member a distance above the outflow apertures and larger than said outflow apertures to provide the flow limiter with the ability to fill a container to which the flow limiter is connected by allowing unrestricted passage of flowable material from the upper outlet chamber to the lower inlet chamber through the hollow cylindrical interior of said slide member.

* * * * *